United States Patent
Haratsch et al.

(10) Patent No.: US 7,274,367 B2
(45) Date of Patent: Sep. 25, 2007

(54) METHOD FOR DEFINING ANIMATION PARAMETERS FOR AN ANIMATION DEFINITION INTERFACE

(75) Inventors: Erich Haratsch, Holmdel, NJ (US); Joern Ostermann, Red Bank, NJ (US)

(73) Assignee: AT&T Corp., New York, NY (US)

( * ) Notice: Subject to any disclaimer, the term of this patent is extended or adjusted under 35 U.S.C. 154(b) by 0 days.

(21) Appl. No.: 11/179,715

(22) Filed: Jul. 12, 2005

(65) Prior Publication Data

US 2005/0243092 A1    Nov. 3, 2005

Related U.S. Application Data

(63) Continuation of application No. 10/291,428, filed on Nov. 12, 2002, now Pat. No. 6,970,172, which is a continuation of application No. 09/975,052, filed on Oct. 12, 2001, now abandoned, which is a continuation of application No. 09/686,077, filed on Oct. 12, 2000, now Pat. No. 6,483,513, which is a continuation of application No. 09/031,728, filed on Feb. 27, 1998, now Pat. No. 6,154,222.

(60) Provisional application No. 60/041,732, filed on Mar. 27, 1997.

(51) Int. Cl.
*G06T 15/00* (2006.01)

(52) U.S. Cl. ...................... 345/473; 345/474

(58) Field of Classification Search ........... 345/473, 345/474, 475, 419, 619; 715/526, 850; 706/101, 706/102
See application file for complete search history.

(56) References Cited

U.S. PATENT DOCUMENTS 6,970,172 B2 *   11/2005   Haratsch et al. ............ 345/473

* cited by examiner

*Primary Examiner*—Phu K. Nguyen

(57) ABSTRACT

A system and a computer-readable medium are provided for controlling a computing device to define a set of computer animation parameters for an object to be animated electronically. An electronic reference model of the object to be animated is obtained. The reference model is altered to form a modified model corresponding to a first animation parameter. Physical differences between the electronic reference model and the modified model are determined and a representation of the physical differences are stored as the first animation parameter. Altering of the reference model and determining of the physical differences are repeated. The stored parameters are provided to a rendering device for generation of the animation in accordance with the stored parameters. Determining physical differences between the electronic reference model and the modified model and storing a representation of the physical differences as the first animation parameter include comparing vertex positions of the reference model.

18 Claims, 1 Drawing Sheet

METHOD FOR DEFINING ANIMATION PARAMETERS FOR AN ANIMATION DEFINITION INTERFACE

This application is a continuation of U.S. patent application Ser. No. 10/291,428, filed on Nov. 12, 2002, now U.S. Pat. No. 6,970,172 which is a continuation of U.S. patent application Ser. No. 09/975,052, filed Oct. 12, 2001 and now abandoned, which is a continuation of U.S. patent application Ser. No. 09/686,077, filed Oct. 12, 2000, now U.S. Pat. No. 6,483,513 which is a continuation of U.S. patent application Ser. No. 09/031,728, filed on Feb. 27, 1998, now U.S. Pat. No. 6,154,222, issued on Nov. 28, 2000, which claims the benefit of U.S. Provisional Patent Application No. 60/041,732, filed on Mar. 27, 1997. The contents of the above U.S. Patents and provisional and non-provisional U.S. Patent Applications are herein incorporated by reference in their entirety.

The present invention generally relates to the field of computer animation and more particularly, is directed to a method for defining animation parameters for an animation definition interface.

BACKGROUND OF THE INVENTION

In recent years, advances in personal computer hardware has made it possible to process audio and digital images on the desktop. These advances were aided by the development of sophisticated formats and standards for coding audio-visual information, such as movies, video, music and the like, in digital compressed formats. Such formats allow large amounts of audio/video data to be processed with relatively low cost equipment.

Under the direction of the International Standards Organization (ISO) and the International Electro-Technical Commission (IEC), the "Moving Picture Experts Group" ("MPEG") was established to development the MPEG suit of standards for coding moving pictures and audio. The major advantage of MPEG over other video and audio standards is said to be much smaller file size for the same quality due to the efficient compression techniques employed.

MPEG encoded video files are typically "played" on a PC, Mac or other consumer electronics device using an MPEG video player and MPEG audio files are "played" using an MPEG audio player. Such players are readily available to PC users and the number of MPEG encoded video and audio files is steady growing.

As the need for more demanding and varied encoding schemes for video and audio content continue to increased, MPEG has been derived into the following categories:

MPEG 1—Coding of moving pictures and associated audio for digital storage media at up approximately 1.5 Mbit/s;

MPEG 2—Generic coding of moving pictures and associated audio information; and

MPEG 4—Coding of audio-visual objects.

Along with the development of MPEG, real-time animation on the desk top also has gained popularity in recent years. Many real-time animation programs, including upcoming MPEG-4 terminals with face and body animation capabilities, can be used to run a proprietary renderer using a proprietary face or body model. Usually, animation of a proprietary model is not compatible with MPEG-4 requirements. Furthermore, the current implementation and modification of animation parameters, like smiles or eyebrow movement, with these renderers is cumbersome and time consuming. Thus, there is a need in the art for an improved method of processing animation parameters.

SUMMARY OF THE INVENTION

Accordingly, it is an object of the present invention to obviate the above-noted shortcomings and disadvantages of real-time animation processes known in the prior art.

Another object of the present invention is to provide an animation definition interface for an MPEG renderer which can be easily and inexpensively implemented allowing for animation of arbitrary downloaded models in the MPEG-4 terminal.

It is another object of the present invention to provide an inexpensive and easily followed method for real-time animation.

The above mentioned disadvantages of prior art real-time animation with MPEG compliant renderers can be eliminated or substantially reduced by the present invention. In accordance with an aspect of the invention a computer-readable medium is provided. The computer-readable medium is a physical medium such as a personal computer hard drive, a tape drive, a compact disc, or random access memory that stores instructions for controlling a computing device to define a set of computer animation parameters for an object to be animated electronically. Animation may be achieved by electronically altering at least a portion of the object in a controlled manner. The instructions include instructions for obtaining an electronic reference model of the object to be animated, instructions for altering the electronic reference model to form a modified model corresponding to a first animation parameter, instructions for determining physical differences between the electronic reference model and the modified model and storing a representation of the physical differences as the first animation parameter, instructions for repeating the instructions for altering the reference model and the instructions for determining the physical differences between the reference model and the modified model and storing a representation of the physical differences as the first animation parameter for each of the animation parameters to be defined, and instructions for providing the stored parameters to a rendering device for generation of the animation in accordance with the stored parameters. The instructions for determining physical differences between the reference model and the modified model and storing a representation of the physical differences as the first animation parameter further include instructions for comparing vertex positions of the reference model.

In a second aspect of the invention, a system is provided for defining a set of computer animation parameters for an object to be animated electronically. The animation is achieved by electronically altering at least a portion of the object in a controlled manner. Example computer hardware, as would be known to one of skill in the art, includes a hard drive storing a computer program that may be loaded into computer memory and run by a central processing unit to carry out the various functions directed by the computer program. The system includes means for obtaining an electronic reference model of the object to be animated, means for altering the electronic reference model to form a modified model corresponding to a first animation parameter, means for determining the physical differences between the electronic reference model and the modified model and storing the differences as the first animation parameter, means for repeating the altering and the determining for each of the animation parameters to be defined, means for providing the stored parameters to a rendering device for generation of the animation in accordance with the stored parameters, means for storing the animation parameters as a lookup function in a table, and means for including the definition of an object as a scenegraph and the definition of high level animation parameters to allow rigid and flexible deformation.

BRIEF DESCRIPTION OF THE DRAWINGS

The novel features of the present invention are set out with particularity in the appended claims, but the invention will be understood more fully and clearly from the following detailed description of the invention as set forth in the accompanying drawings, in which:

DESCRIPTION OF THE PREFERRED EMBODIMENT

The MPEG-4 standard described above strives to define a standardized interface to allow animation of face and body models within an MPEG-4 terminal. Due to the rapid advances in computer graphics hardware, it is not foreseen that MPEG-4 will standardize face and body models. Instead, face and body definition parameters ("FDP", "BDP") are defined for specifying the shape and surface of a model. For the animation of the models, face and body animation parameters ("FAP", "BAP") are standardized.

These animation parameters include low-level parameters like "move left eyebrow up" and "tongue roll" as well as high-level parameters like "smile". Assuming that different terminals allow for models with different degrees of complexity, a process is required that allows the rapid development of models suited for animation. The use of standardized file format like Virtual Reality Modeling Language ("VRML") allow the use of commonly available modeling software (modelers), like COSMO 3D or PowerAnimator, to design animations. However, formats like VRML 1, VRML 2, and OpenInventor only support the description of rigid objects.

VRML was conceived in the early part of 1994 and was developed in response to a need for a three dimensional graphical visualization standard. VRML 1.0 was the first version of the standard and provided basic support for describing three dimensional objects such as spheres, planes, cubes cylinders, cones and the like.

Version 2.0 of the VRML standard built on the progress of Version 1.0 by adding such capabilities as object behavior.

Face and body animation requires flexible deformation. Such a feature is not currently conveniently supported by OpenInventor or VRML 2. Accordingly, real-time renders which are designed to read and write VRML or OpenInventor files must be modified in order to accommodate animation. In addition, convenient editors for defining the animation capabilities are not known in the prior art.

In accordance with the present invention, an interface between a modeler, e.g., Alias/Wavefront Power Animator, and real-time animation software is provided. The present invention allows for the rapid definition, modification and implementation of animation parameters. Since the interface reads VRML files from the modeler, it is independent of the modeler. The interface writes a VRML file and one accompanying table for each defined animation parameter thus making this information easily integrate able into proprietary renderers.

Figure 1:
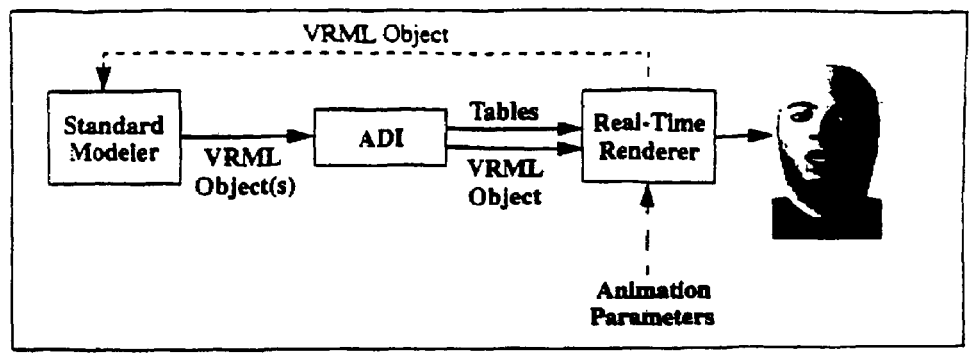
FIG. 1 illustrates how the animation definition interface of the present invention is integrated with a modeler and renderer.

The interface of the invention takes as its input several VRML files describing static models with a topology appropriate for the renderer. FIG. 1 illustrated how the system is integrated with the modeler and the renderer. The model of the renderer is exported as a VRML file and read into the modeler. In order to design the behavior of the model for one animation parameter, the model is deformed using the tools of the modeler. Usually, restrictions on the topology of the model exist. For simplicity, it is assumed that the model is deformed only by moving relevant vertices and not by changing its topology. The modeler exports the deformed model as a VRML file.

The Animation Definition Interface ("ADI") compares the output of the modeler with its input, i.e., the model exported from the renderer. By comparing vertex positions of the two models, the vertices affected by the newly designed animation parameter can be identified. The ADI computes for each affected vertex a 3D displacement vector defining the deformation and exports this information in a table.

The renderer reads the VRML file of the model and the table in order to determine the definition of the new animation parameter. The renderer can now use the newly defined animation as required by the animation parameters.

Most of the newly available graphics boards for PCs and workstations support rendering based on the OpenGL engine. The VRML 2 file format is based on OpenInventor that itself is based on OpenGL. Thus, it is essential to enable real-time deformations of models rendered on an OpenGL engine. Use of a scene graph usually does not allow the movement of parts of an object. Therefore, the vertex positions of the scene graph are updated through the animation parameters as defined in the table. Only the vertex coordinates of the scene graph are updated thus allowing one to take full advantage of the OpenGl rendering engine speed for global motions, lighting texture mapping, etc.

Figure 2:
FIG. 2 illustrates the piece-wise linear approximation of a complex deformation applied to a vertex of the uniform model.

The conversion process described above allows the renderer to only create deformations of moving vertices along the defined 3D displacement vector. While this might be sufficient for simple actions like move "left eye brow up", complex motions like "smile" or "tongue roll up" can not be sufficiently modeled by linearly moving vertices. Thus, in accordance with the present invention, several VRML files are created for different phases of the animation or values of the animation parameter. Such files allow for a piece-wise linear approximation of complex deformations. This process is illustrated in FIG. 2.

The following table shows an example of an animation parameter ("AP") definition for 2 vertices, where the 3-D motion is defined in 3 intervals. The parameter AP is positive and in Interval 1 is valid for $0<AP<=0.33$, in Interval 2 is valid for $0.33<AP<=0.66$ and in Interval 3 is valid for $0.66<AP<=1.0$.

| Vertex No. | 1st Interval | 2nd Interval | 3rd Interval |
|---|---|---|---|
| 5 | (0.1, 0.7, −5) | (0, 2, 4) | (0, 0.1, −0.1) |
| 13 | (3, 4, −2) | (3, 2, 4) | (−1, −2, −3) |

Given AP=0.3, vertex 5 would be displaced by:

$$0.3 \times (0.1, 0.7, -5)^T.$$

For AP=0.6, vertex 5 would be displaced by:

$$0.33 \times (0.1, 0.7, -5)^T + (0.6 - 0.33) \times (0, 2, 4)^T.$$

The above approach can be extended in order to allow positive and negative animation parameters as well as unequal intervals for defining the motion of a vertex. Other extensions include replacing the linear approximation of the vertex motion by general functions like polynomials. These functions could be different for each animation parameter. A further generalization is to make these functions dependent on more than one animation parameter.

For a smile, writing three files with "smile=0.3", "smile=0.7" and "smile=1.0" are sufficient to allow for a subjectively pleasant piece-wise linear approximation of this relatively complex deformation.

The above outlined procedure can be used to define the entire set of MPEG-4 FAPs for a proprietary face animation renderer. The model is an extension of Parke's model. Applicants have found that FAPs integrate nicely with the model's talking capability controlled by a TTS system.

Figure 3:
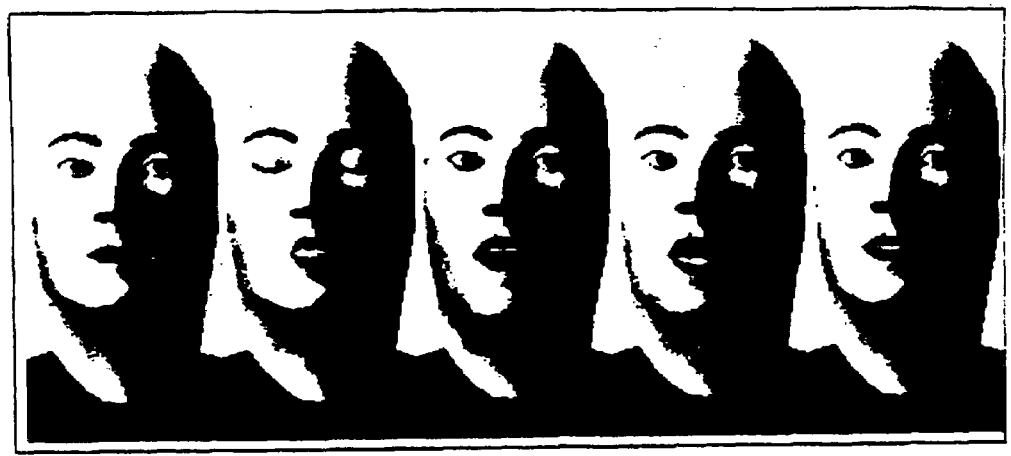
FIG. 3 illustrates the use of MPEG-4 for animation of computer graphics heads by synthetic speech and animation parameters.

Animated sequences using different personalities also are illustrated in FIG. 3.

Arbitrary head models in VRML and animation tables can be created in two ways, a natural for personalized head models and a synthetic one.

In the natural approach, a VRML model of a person's head is created by, for example, using cyberscan data. The animation table is generated by image analysis. Images of the person are taken in a neutral state and for each facial expression corresponding to the different animation parameters. The method described above could be used to calculate the displacement vectors for IndexedFaceSet nodes. Applying this algorithm for different intensities of the person's expression improves the realism of the facial movements during animation. An animation system which downloads a person's data obtained in this way represents a new architecture for a primitive model-based decoder.

An example of how the present invention may be implemented will now be described.

| ASCII Specifiction - FDP | | | | | |
|---|---|---|---|---|---|
| 000 | 000 | exposedField | SFNode | featurePointsCoord | NULL |
| 001 | 001 | exposedField | SFNode | textureCoord4Feature Points | NULL |
| 010 | 010 | exposedField | SFNode | calibrationMesh | NULL |
| 011 | 011 | exposedField | SFNode | faceTexture | NULL |
| 100 | 100 | exposedField | MFNode | animationDefinition Tables[ ] | NULL |
| 101 | 101 | exposedField | SFNode | faceSceneGraph | NULL |

The FDP node defines the face model to be used at the receiver. Two options can be supported:

1. calibration information is downloaded, so that the proprietary face of the receiver can be configured using facial feature points and optionally a 3D mesh or texture; and
2. a face model is downloaded with the animation definition of the Facial Animation Parameters. This face model replaces the proprietary face model in the receiver.

Each field may be described as follows:

| | |
|---|---|
| featurePointsCoord | contains a Coordinate node. Specifies feature points for the calibration of the proprietary face. The coordinates are listed in the "point" field in the Coordinate node in the prescribed order, that a feature point with a lower label is listed before a feature point with a higher label (e.g. feature point 3.14 before feature point 4.1). |
| textureCoord4-Feature Points | contains a TextureCoordinate node. Specifies the texture coordinates for the feature points. |
| calibrationMesh | contains an IndexedFaceSet node. Specifies a 3D mesh for the calibration of the proprietary face model. All fields in the IndexedFaceSet node can be used as calibration information. |
| faceTexture | contains an ImageTexture or PixelTexture node. Specifies texture to be applied on the proprietary face model. |
| animationDefinition tables | contains AnimationDefinitionTable nodes. If a face model is downloaded, the behavior of FAPs is defined in this field. |
| faceSceneGraph | contains a Group node. Grouping node for face model rendered in the compositor. Can also be used to download a face model: in this case the effect of Facial Animation Parameters is defined in the "animationDefinitionTables" field. |

Other ASCII specifications are set forth in the tables below:

| ?? | | | AnimationDefinitionTable | | | |
|---|---|---|---|---|---|---|
| 00 | field | | SFInt | fapID | 1 | 1 | 68 |
| 01 | field | | SFInt | highLevelSelect | 1 | 1 | 64 |
| 10 | 0 | exposedfield | Mfnode | table [ ] NULL | | | |

| ?? | | | AnimationDefTransform | |
|---|---|---|---|---|
| 00 | field | ?? | nodeIDTransform | " " |
| 01 | field | SFString | fieldID | na |
| 10 | field | GenericSF | fieldValue | na |

| ? | | | AnimationDefIndexedFaceSet |
|---|---|---|---|
| 00 | field | ?? | nodeIDIndexedFaceSet |
| 01 | field | MFInt32 | intervalBorders [ ] |
| 10 | field | MFint32 | coordIndex [ ] |
| 11 | field | MFVec3f | displacements [ ] |

While the present invention has been described with respect to a preferred embodiment, the invention is not limited thereto. In general, this version is applicable when defining animation parameters defining flexible deformation of computer graphic models. The scope of the invention is limited only by the attached claims.

We claim as our invention:

1. A computer-readable medium storing instructions for controlling a computing device to define a set of computer animation parameters for an object to be animated electronically, wherein animation is achieved by electronically altering at least a portion of the object in a controlled manner, the instructions comprising:

instructions for obtaining an electronic reference model of the object to be animated;

instructions for altering the reference model to form a modified model corresponding to a first animation parameter;

instructions for determining physical differences between the reference model and the modified model and storing a representation of the physical differences as the first animation parameter;

instructions for repeating the instructions for altering the reference model and the instructions for determining the physical differences between the reference model and the modified model and storing a representation of the physical differences as the first animation parameter for each of the animation parameters to be defined; and instructions for providing the stored parameters to a rendering device for generation of the animation in accordance with the stored parameters, wherein:

the instructions for determining physical differences between the reference model and the modified model and storing a representation of the physical differences as the first animation parameter further comprise:

instructions for comparing vertex positions of the reference model.

2. The computer-readable medium of claim 1, further comprising:

instructions for storing animation parameters as a lookup function in a table.

3. The computer-readable medium of claim 2, further comprising:

instructions for converting the animation parameters to a format for downloading to a rendering device along with the electronic reference model.

4. The computer-readable medium of claim 1, further comprising:

instructions for including the definition of an object as a scenegraph and the definition of high level animation parameters to allow rigid and flexible deformation.

5. The computer-readable medium of claim 4, further comprising:

instructions for downloading the definition of the object to a client that animates the electronic reference model.

6. The computer-readable medium of claim 1, wherein the object includes characteristics of a human being and the computer-readable medium further comprises:

instructions for defining a major animation parameter representing a human expression, the instructions for defining a major animation parameter representing a human expression further comprising:

instructions for defining a plurality of animation parameters representing the human expression; and instructions for storing the plurality of animation parameters as the major parameter.

7. The computer-readable medium of claim 6, further comprising instructions for storing the animation parameters as function in a look up table.

8. The computer-readable medium of claim 6, wherein the major animation parameter represents one of a smile, a frown, a movement of an eye, an eye wink, a tongue roll, the movement of a mouth, simulated speech, a human gesture, visemes, or deformation at the joints of a simulated human skeleton.

9. The computer-readable medium of claim 1, wherein the instructions for determining physical differences between the reference model and the modified model and storing a representation of the physical differences as the first animation parameter farther comprise:

instructions for computing a spline function from the determined physical differences.

10. The computer-readable medium of claim 1, wherein the instructions for determining physical differences between the reference model and the modified model and storing a representation of the physical differences as the first animation parameter farther comprise:

instructions for computing three dimensional displacement vectors defining differences between vertex positions of the modified model and the vertex positions of the reference model.

11. The computer-readable medium of claim 10, wherein the instructions for determining physical differences between the reference model and the modified model and storing a representation of the physical differences as the first animation parameter further comprise:

instructions for storing the three dimensional displacement vectors in a table as animation parameters.

12. A system for defining a set of computer animation parameters for an object to be animated electronically, wherein the animation is achieved by electronically altering at least a portion of the object in a controlled manner, the system comprising:

means for obtaining an electronic reference model of the object to be animated;

means for altering the reference model to form a modified model corresponding to a first animation parameter;

means for determining the physical differences between the electronic reference model and the modified model and storing the differences as the first animation parameter;

means for repeating the altering and the determining for each of the animation parameters to be defined;

means for providing the stored parameters to a rendering device for generation of the animation in accordance with the stored parameters;

means for storing the animation parameters as a lookup function in a table; and means for including the definition of an object as a scenegraph and the definition of high level animation parameters to allow rigid and flexible deformation.

13. The system of claim 12, wherein the high level animation parameters correspond to rigid motion and rigid and flexible deformation.

14. The system of claim 12, further comprising means for downloading the object to a client or a player that animates the model.

15. The system of claim 12, further comprising:

means for defining a plurality of associated animation parameters representing an animation sequence; and means for storing the plurality of associated animation parameters as a major parameter.

16. The system of claim 15, further comprising:

means for defining a plurality of major animation parameters, wherein each of the plurality of major animation parameters presents a different animation sequence.

17. The system of claim 16, further comprising:

means for combining the plurality of major animation parameters; and means for storing the plurality of major animation parameters as a super animation parameter.

18. The system of claim 12, wherein the animation is defined by spline functions, rational polynomial functions, or general functions.

* * * * *